(12) United States Patent
Flannery et al.

(10) Patent No.: US 9,719,293 B1
(45) Date of Patent: *Aug. 1, 2017

(54) FREE STANDING SLIDING PANEL FOOTED BARRIER

(71) Applicant: Carlson Pet Products, Inc., Longboat Key, FL (US)

(72) Inventors: Mark A. Flannery, Longboat Key, FL (US); Porter R. Million, Minneapolis, MN (US)

(73) Assignee: Carlson Pet Products, Inc., Longboat Key, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,617

(22) Filed: Feb. 14, 2016

Related U.S. Application Data

(63) Continuation of application No. 13/916,426, filed on Jun. 12, 2013, now Pat. No. 9,260,910.

(60) Provisional application No. 61/659,419, filed on Jun. 13, 2012, provisional application No. 61/765,984, filed on Feb. 18, 2013.

(51) Int. Cl.
*E06B 9/00* (2006.01)
*E06B 9/02* (2006.01)

(52) U.S. Cl.
CPC .......... *E06B 9/02* (2013.01); *E06B 2009/002* (2013.01)

(58) Field of Classification Search
CPC . E04B 2002/7483; E04B 2/7407; E04B 2/827
USPC .......... 160/350, 351, 377, 374, 372; 256/24; 49/55, 463, 57; 248/158, 163.1, 677, 248/188.8, 688, 188.9, 188.1
See application file for complete search history.

(56) References Cited

U.S. PATENT DOCUMENTS

| 113,204 | A | 3/1871 | Porter |
| 266,246 | A | 10/1882 | Willer |
| 373,794 | A | 11/1887 | Armbruster |
| 562,095 | A | 6/1896 | Phillips |
| 712,971 | A | 11/1902 | Sanders |
| 1,008,146 | A | 11/1911 | Herriman |
| 1,196,443 | A | 8/1916 | Ellis |
| 1,196,447 | A | 8/1916 | Ellis |
| 1,341,188 | A | 5/1920 | Manyak et al. |
| 1,411,824 | A | 4/1922 | Wepplo |
| 1,425,072 | A | 8/1922 | Adams |
| 1,537,712 | A | 5/1925 | Specht |
| 1,542,151 | A | 6/1925 | Lehtonen |
| 1,547,048 | A | 7/1925 | Klein |

(Continued)

FOREIGN PATENT DOCUMENTS

| GB | 722976 | 2/1955 |
| GB | 907632 | 10/1962 |

(Continued)

*Primary Examiner* — Katherine Mitchell
*Assistant Examiner* — Johnnie A Shablack

(57) ABSTRACT

A free standing barrier includes two panels that slide parallel to each other. Each of the panels includes a lower outer corner portion on which is mounted a foot. The feet, in combination with each other, hold the barrier upright and make the barrier free standing. One foot engages one sliding panel and the other foot engages the other sliding panel. Each of the feet includes an outward extension that works as a stop against, for example, a doorjamb, to prevent the barrier from being pushed, such as by a dog, through the opening that the barrier is intended to close off.

17 Claims, 6 Drawing Sheets

(56) References Cited

U.S. PATENT DOCUMENTS

| | | |
|---|---|---|
| 1,598,438 A | 8/1926 | Hallowell |
| 1,726,966 A | 9/1929 | Schlayer et al. |
| 2,222,008 A | 11/1940 | White |
| 2,378,683 A | 6/1945 | Buchanan |
| 2,520,997 A | 9/1950 | Cavanagh |
| 2,577,034 A | 12/1951 | Quinlan |
| 2,610,763 A | 9/1952 | Mendelson |
| 2,610,830 A | 9/1952 | Beatty |
| 2,629,619 A | 2/1953 | May |
| 2,851,746 A | 9/1958 | McPhaden |
| 2,896,277 A | 7/1959 | Halligan |
| 2,918,318 A | 12/1959 | Sacharski |
| 2,982,353 A | 5/1961 | Luger |
| 2,998,063 A | 8/1961 | Hafner |
| 3,124,949 A | 3/1964 | Friedman |
| 3,132,400 A | 5/1964 | McDonald |
| 3,163,205 A | 12/1964 | Gottlieb |
| 3,431,004 A | 3/1969 | Schell |
| 3,431,966 A | 3/1969 | Injeski |
| 3,437,365 A | 4/1969 | Zadanoff et al. |
| 3,489,201 A | 1/1970 | Curry et al. |
| 3,490,805 A | 1/1970 | Mastrovito |
| 3,651,853 A | 3/1972 | Pedley |
| 3,713,474 A | 1/1973 | Orlando |
| 4,056,903 A | 11/1977 | Guarnere |
| 4,127,156 A | 11/1978 | Brandt |
| 4,170,885 A | 10/1979 | Lundgren |
| 4,200,254 A | 4/1980 | Nelson |
| 4,270,668 A | 6/1981 | Berfield |
| 4,394,563 A | 7/1983 | Schnell |
| 4,486,979 A | 12/1984 | Reitemeyer |
| 4,502,167 A | 3/1985 | Porzelius |
| 4,574,863 A | 3/1986 | Coleman et al. |
| 4,583,715 A | 4/1986 | Wright |
| 4,607,455 A | 8/1986 | Bluem et al. |
| 4,677,791 A | 7/1987 | Larson et al. |
| 4,688,619 A | 8/1987 | Kessler et al. |
| 4,777,765 A | 10/1988 | Johnson, Jr. |
| 4,787,174 A | 11/1988 | Brown |
| 4,884,614 A | 12/1989 | Spurling |
| 4,944,117 A | 7/1990 | Gebhard et al. |
| 5,031,683 A | 7/1991 | Marvy et al. |
| 5,060,421 A | 10/1991 | Castelli |
| 5,081,723 A | 1/1992 | Saunders |
| 5,117,585 A | 6/1992 | Andrisin, III |
| 5,165,148 A | 11/1992 | Fleischer et al. |
| 5,174,532 A | 12/1992 | Huang |
| 5,203,596 A | 4/1993 | Stevens |
| 5,272,840 A | 12/1993 | Knoedler et al. |
| 5,356,346 A | 10/1994 | Katje et al. |
| 5,367,829 A | 11/1994 | Crossley et al. |
| 5,396,732 A | 3/1995 | Andersen |
| 5,402,988 A | 4/1995 | Eisele |
| 5,427,342 A | 6/1995 | Gagnon |
| 5,442,881 A | 8/1995 | Asbach et al. |
| 5,462,318 A | 10/1995 | Cooke |
| 5,469,807 A | 11/1995 | Kosmaczeska |
| 5,528,859 A | 6/1996 | Taylor et al. |
| 5,535,552 A | 7/1996 | Stern |
| 5,570,500 A | 11/1996 | Merkel |
| 5,570,543 A | 11/1996 | Bishop |
| 5,617,674 A | 4/1997 | Terrill |
| 5,622,347 A | 4/1997 | Nourry |
| 5,664,371 A | 9/1997 | Berliner |
| 5,701,991 A | 12/1997 | Helmetsie |
| 5,716,035 A | 2/1998 | Nourry et al. |
| 5,769,292 A | 6/1998 | Cucheran et al. |
| 5,771,954 A | 6/1998 | Benner et al. |
| 5,782,039 A | 7/1998 | Scherer et al. |
| 5,865,484 A | 2/1999 | Johns |
| 5,878,695 A | 3/1999 | Gent |
| 5,878,802 A | 3/1999 | Richter et al. |
| 5,906,068 A | 5/1999 | Bode |
| 5,906,069 A | 5/1999 | Berliner |
| 5,993,103 A | 11/1999 | Christensen |
| 6,016,629 A | 1/2000 | Sylvester et al. |
| 6,056,038 A | 5/2000 | Foster et al. |
| 6,058,655 A | 5/2000 | Gravel |
| 6,059,242 A | 5/2000 | Lefevre et al. |
| 6,061,972 A | 5/2000 | Thorp |
| 6,112,460 A | 9/2000 | Wagnitz |
| 6,112,461 A | 9/2000 | Cheng |
| 6,123,321 A | 9/2000 | Miller |
| 6,141,912 A | 11/2000 | Graham et al. |
| 6,161,334 A | 12/2000 | Goodin |
| 6,176,042 B1 | 1/2001 | Rossman et al. |
| 6,190,084 B1 | 2/2001 | Ibanez |
| 6,233,874 B1 | 5/2001 | Johnson, Jr. |
| 6,348,028 B1 | 2/2002 | Cragg |
| 6,367,852 B1 | 4/2002 | Aspenwall |
| 6,370,803 B1 | 4/2002 | Burquest |
| 6,449,901 B1 | 9/2002 | Gibree et al. |
| 6,474,265 B1 | 11/2002 | Powell |
| 6,477,984 B1 | 11/2002 | Kleinsasser |
| 6,497,075 B1 | 12/2002 | Schreiner et al. |
| 6,499,528 B1 | 12/2002 | Johnson |
| 6,523,795 B2 | 2/2003 | Gutgsell et al. |
| 6,598,649 B1 | 7/2003 | Moore et al. |
| 6,631,751 B2 | 10/2003 | Coles et al. |
| 6,681,523 B1 | 1/2004 | Stener |
| 6,711,857 B1 | 3/2004 | Wagnitz et al. |
| 6,892,784 B2 | 5/2005 | Maas |
| 6,896,028 B2 | 5/2005 | Brennan |
| 7,036,798 B1 | 5/2006 | Olson |
| 7,111,815 B2 | 9/2006 | Mettler et al. |
| 7,131,235 B2 | 11/2006 | Hicks |
| 7,152,372 B2 | 12/2006 | Cheng |
| D579,609 S | 10/2008 | Hirokawa et al. |
| 7,523,715 B2 | 4/2009 | Mettler et al. |
| 7,568,449 B2 | 8/2009 | Hirokawa et al. |
| 7,716,874 B2 | 5/2010 | Ventrola |
| 7,739,983 B2 | 6/2010 | Hirokawa et al. |
| 7,775,002 B2 | 8/2010 | Puchniak |
| 7,775,253 B1 | 8/2010 | Milligan |
| 7,789,585 B2 | 9/2010 | Christensen et al. |
| 7,798,454 B2 | 9/2010 | Stoller |
| 7,798,455 B2 | 9/2010 | Kumazawa |
| 7,866,074 B2 | 1/2011 | McComb et al. |
| 7,874,090 B2 | 1/2011 | Flagg |
| 7,908,803 B2 | 3/2011 | Puchniak |
| 7,950,184 B2 | 5/2011 | Flannery |
| 7,954,456 B2 | 6/2011 | Hirokawa et al. |
| 8,141,517 B2 | 3/2012 | Shimoda et al. |
| 8,230,816 B2 | 7/2012 | Hirokawa et al. |
| 8,261,490 B2 | 9/2012 | Flannery et al. |
| 8,297,336 B2 | 10/2012 | Yates |
| 8,393,585 B2 | 3/2013 | Han et al. |
| 8,561,349 B2 | 10/2013 | Flannery et al. |
| 8,713,851 B2 | 5/2014 | Flannery et al. |
| 9,260,910 B1 * | 2/2016 | Flannery ............... E06B 9/00 |
| 2002/0153733 A1 | 10/2002 | Fuchs |
| 2003/0197164 A1 | 10/2003 | Monahan et al. |
| 2006/0107901 A1 | 5/2006 | Hirokawa et al. |
| 2006/0175487 A1 | 8/2006 | Trageser et al. |
| 2006/0260195 A1 | 11/2006 | Witman et al. |
| 2007/0074453 A1 | 4/2007 | Flannery |
| 2008/0110412 A1 | 5/2008 | Shimoda et al. |
| 2008/0110413 A1 | 5/2008 | Kobayashi et al. |
| 2008/0202047 A1 | 8/2008 | Flannery |
| 2008/0256865 A1 | 10/2008 | Trujillo et al. |
| 2008/0265233 A1 | 10/2008 | Flannery |
| 2008/0282613 A1 | 11/2008 | Heads |
| 2009/0071074 A1 | 3/2009 | Yates |
| 2009/0155016 A1 | 6/2009 | Guo |
| 2009/0158665 A1 | 6/2009 | Wu |
| 2009/0178624 A1 | 7/2009 | Hirokawa et al. |
| 2009/0293363 A1 | 12/2009 | Flannery |
| 2010/0083577 A1 * | 4/2010 | Flannery ............... E06B 9/06 49/130 |
| 2010/0282178 A1 | 11/2010 | Hirokawa et al. |
| 2011/0174936 A1 | 7/2011 | Cox |
| 2012/0084916 A1 | 4/2012 | Flannery et al. |
| 2012/0144745 A1 | 6/2012 | Yates et al. |

(56) References Cited

U.S. PATENT DOCUMENTS

2012/0233922 A1    9/2012   Flannery et al.
2012/0235101 A1    9/2012   Flannery et al.
2013/0062025 A1    3/2013   Bromberek

FOREIGN PATENT DOCUMENTS

JP    1087937    10/2000
JP    1169549     4/2003

\* cited by examiner

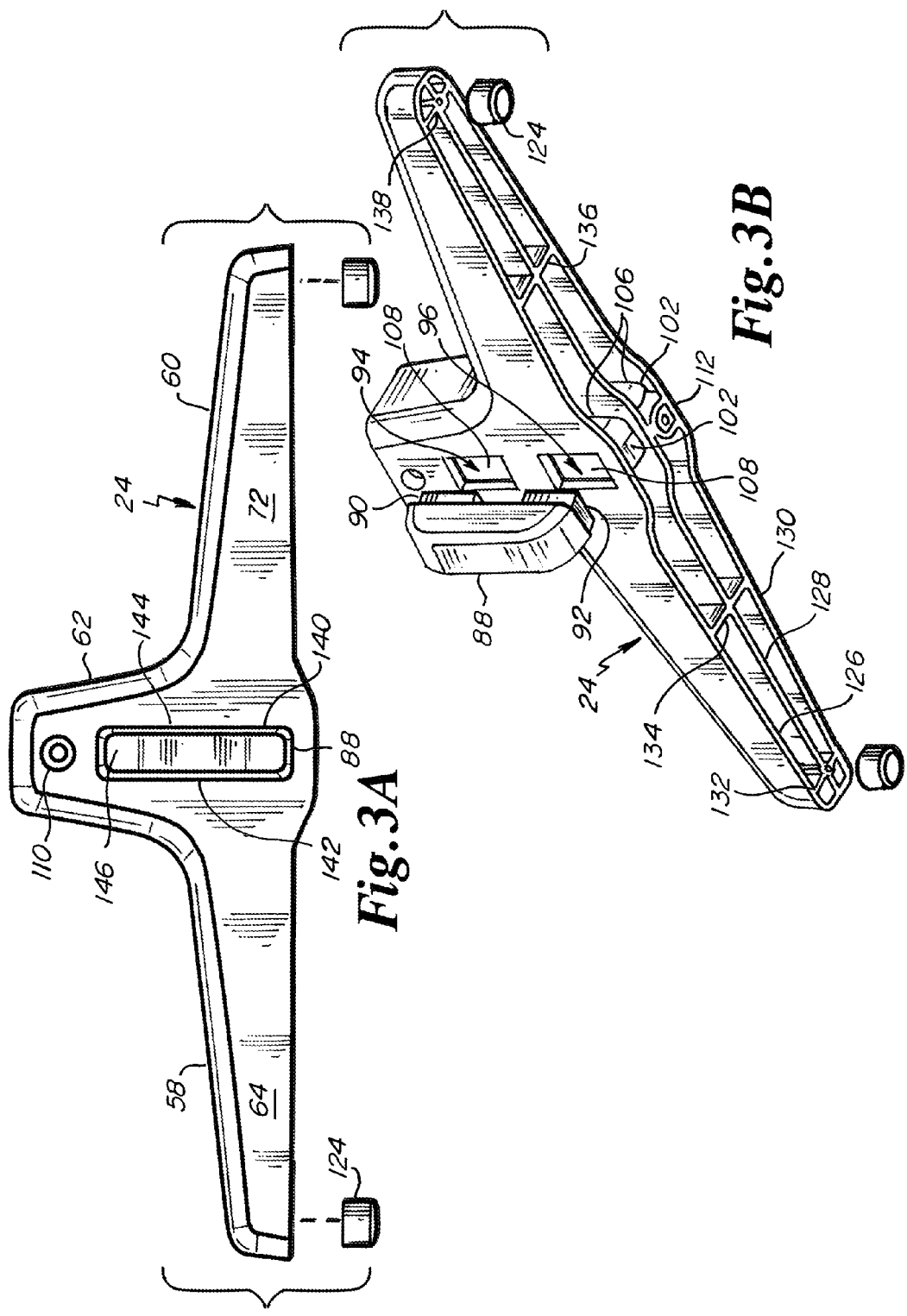

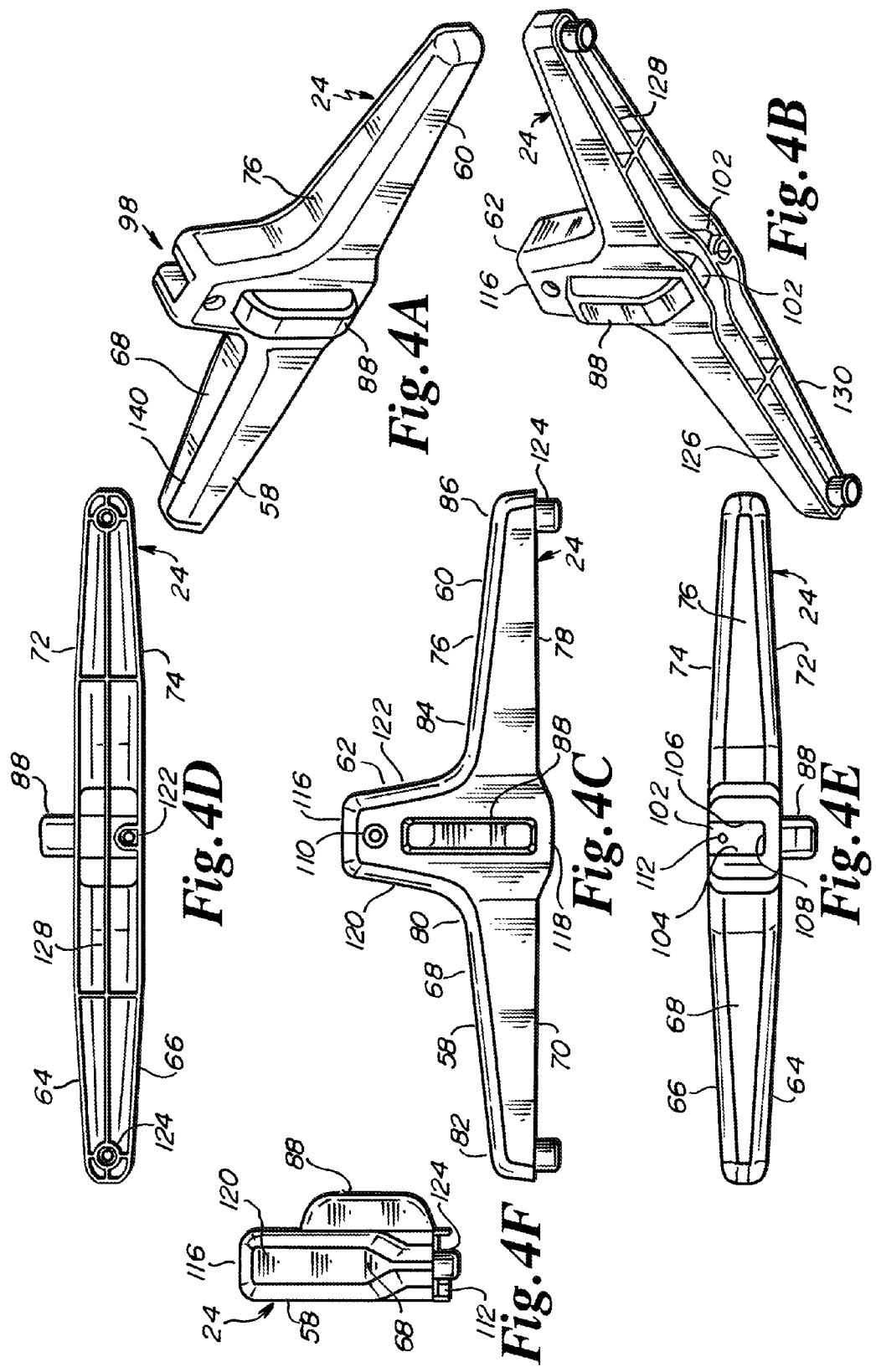

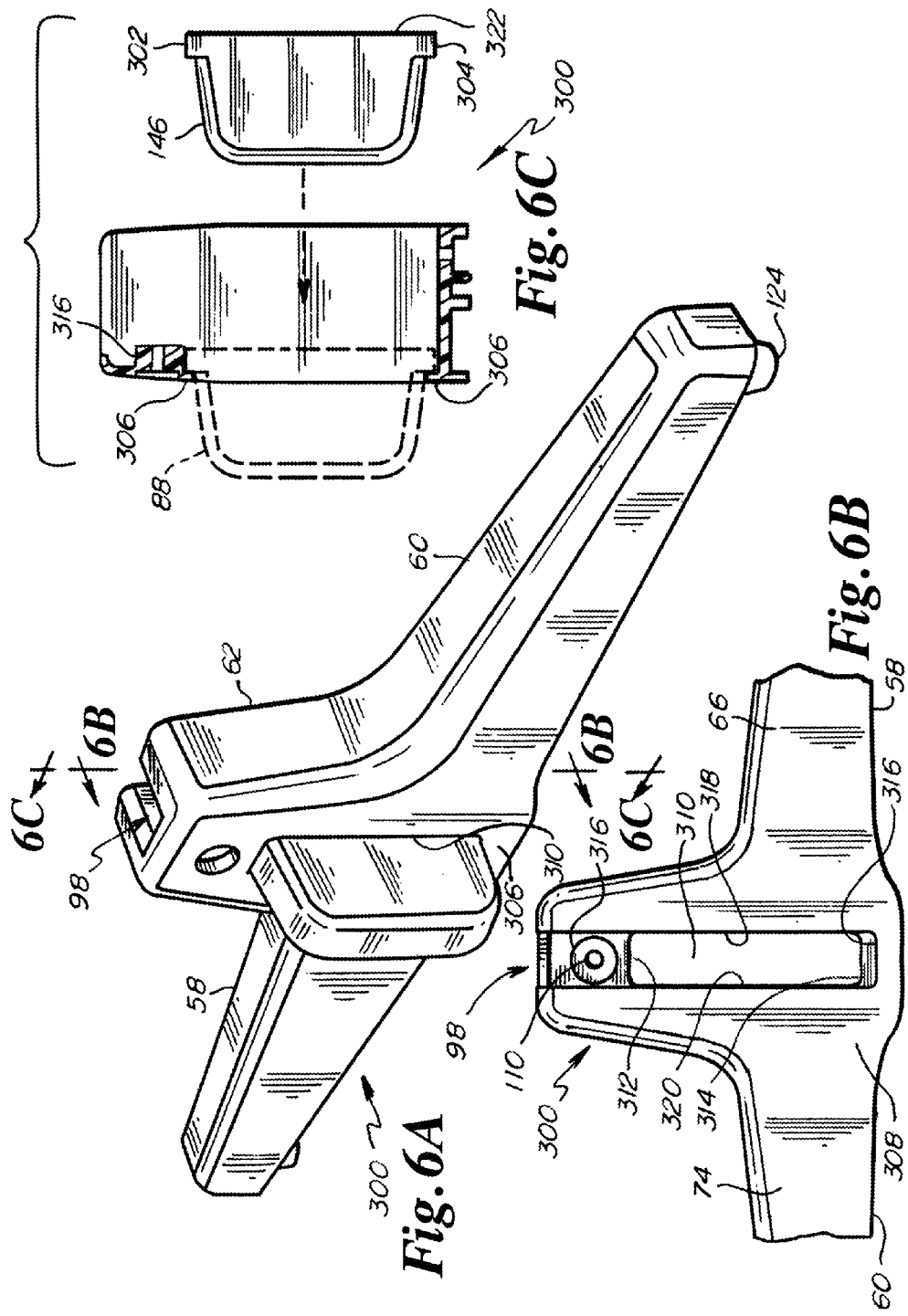

us9,719,293 B1

FREE STANDING SLIDING PANEL FOOTED BARRIER

This application is a continuation of U.S. patent application Ser. No. 13/916,426 filed Jun. 12, 2013 (now U.S. Pat. No. 9,260,910 issued Feb. 16, 2016), which application claims the benefit under 35 U.S.C. 119(e) of the following U.S. provisional patent application Nos.: 1) 61/659,419 filed Jun. 13, 2012, and 2) 61/765,984 filed Feb. 18, 2013, both of which provisional applications are hereby incorporated by reference in their entireties into this application.

FIELD OF THE INVENTION

The present invention relates generally to a free standing barrier, more particularly to a free standing barrier that includes a pair of sliding panels sliding parallel to each other, and specifically to such a free standing sliding panel barrier having a pair of unique feet.

BACKGROUND OF THE INVENTION

Wooden gates have become a relatively popular item, especially to the homeowner that has a child or pet or several of both. Gates keep children and pets out of the kitchen, or away from the top of the stairs, or temporarily away from an area being cleaned. Wooden gates can be preferred over metal gates on an aesthetic basis. Wooden gates conventionally have a pair of main panels and a pair of side panels.

Wooden gates can be cumbersome, heavy and include a relatively great number of parts. These three problems can be cured by a single step: taking off the pair of side panels to make a more simple wooden gate.

SUMMARY OF THE INVENTION

A feature of the present invention is the provision in a free standing sliding panel footed barrier, of a first foot engaging a panel of the barrier for supporting the panel relative to a floor, where the foot includes a front portion that extends to the front side of the barrier and a back portion that extends to the back side of the barrier, where the front and back portions are one-piece and integral.

Another feature of the present invention is the provision in a free standing sliding panel footed barrier, of the panel including a lower outside vertically extending portion and of the foot having a vertically extending slot for receiving the lower outside vertically extending portion.

Another feature of the present invention is the provision in a free standing sliding panel footed barrier, of the panel including a horizontal extending portion and of the foot including a horizontally extending slot for receiving the lower outside horizontally extending portion.

Another feature of the present invention is the provision in a free standing sliding panel footed barrier, of the panel including a lower outside corner portion having a vertical edge and a horizontal edge, and wherein the foot includes a slot for receiving the lower outside corner portion.

Another feature of the present invention is the provision in a free standing sliding panel footed barrier, of the front portion of the foot having sides that taper toward each other while running toward a distal end of the front portion, of the back portion of the foot having sides that taper toward each other while running toward a distal end of the back portion, of the front portion having a top that tapers toward an underside while running toward the distal end of the front portion, and of the back portion having a top that tapers toward an underside while running toward the distal end of the back portion such that space occupied by the foot is minimized so as to maximize safety for people walking nearby.

Another feature of the present invention is the provision in a free standing sliding panel footed barrier, of the front and back portions of the foot being aligned lengthwise with each other.

Another feature of the present invention is the provision in a free standing sliding panel footed barrier, of the foot having a middle portion between the front and back portions of the foot, of the middle portion being one-piece and integral with each of the front and back portions of the foot, and of the middle portion having a slot that receives a section of the first panel.

Another feature of the present invention is the provision in a free standing sliding panel footed barrier, of an extension that protrudes outwardly of each of the front and back portions of the foot to work as a stop for preventing the barrier from being pushed through a passageway.

Another feature of the present invention is the provision in a free standing sliding panel footed barrier, of a first foot including outer and inner half sections that are engaged to each other where an inner face of the outer half section and an outer face of the inner half section are generally defined by a longitudinally and vertically running plane such that front and back portions of the first foot remain one-piece and integral with each other.

Another feature of the present invention is the provision in a free standing sliding panel footed barrier, of a first foot including laterally extending pin connectors that engage outer and inner half sections of a longitudinally split first foot to each other.

Another feature of the present invention is the provision in a free standing sliding panel footed barrier, of an extension that protrudes outwardly of each of the front and back portions of the foot to work as a stop for preventing the barrier from being pushed through a passageway where the extension is retractable to a position between inner and outer longitudinally extending faces of the foot.

An advantage of the present invention is safety. A middle portion of the foot supports and captures a lower horizontally extending frame member of the barrier and further supports and captures a vertically extending frame member of the barrier to provide for a sturdy support. The front and back portions of the foot taper quickly three ways to a distal end to minimize the space occupied by the foot and thereby maximize safety for children and adults walking nearby. An outward extension on the foot works as a stop to prevent the barrier from being pushed into a passageway, such as ajar into a passageway, and thereby especially minimizes the chances of dogs, who have a tendency to push, getting past the barrier.

Another advantage of the present invention is simplicity. The present free standing sliding panel footed barrier has no side barriers, thereby providing a more simple gate with fewer parts and less weight. With fewer parts and less weight, the panels are more easily slid back and forth and the barrier as a whole is more easily slid or carried from place to place.

Another advantage of the present invention is that the barrier may be slid quickly into a passageway. Outer sides of feet, employed to make the barrier free standing, are tapered so that sliding the barrier into a doorway requires less than perfect alignment, unlike sliding a square peg into a square hole of equal dimensions where a perfect alignment is necessary. In other words, a distance between distal ends of front portions of the feet is less than a distance between outer sides of middle sections of the feet and less than a distance between opposite door jambs. In still other words, outer tapering sides of the opposite feet form in combination a V-shaped structure that can easily slide into a doorway.

BRIEF DESCRIPTION OF THE DRAWINGS

FIG. 3A is a side, detail, partially exploded view of the foot of the free standing sliding panel footed barrier of FIG. 1A.

FIG. 3B is a perspective, detail, partially exploded view of the foot of FIG. 3A.

FIG. 4A is a perspective view of the foot of FIG. 3A.

FIG. 4B is a bottom perspective view of the foot of FIG. 3A.

FIG. 4C is a side view of the foot of FIG. 3A.

FIG. 4D is a bottom view of the foot of FIG. 3A.

FIG. 4E is a top view of the foot of FIG. 3A.

FIG. 4F is an end view of the foot of FIG. 3A.

FIG. 6A is a perspective end view of an alternate embodiment of the foot of FIG. 1A, where a door jamb stop is retractable into the foot.

FIG. 6B is a view at lines 6B-6B of FIG. 6A showing a side view of the foot of FIG. 6A.

FIG. 6C is a view at lines 6C-6C of FIG. 6A showing an exploded and partially phantom view of the foot of FIG. 6A.

DESCRIPTION

Figure 1A:
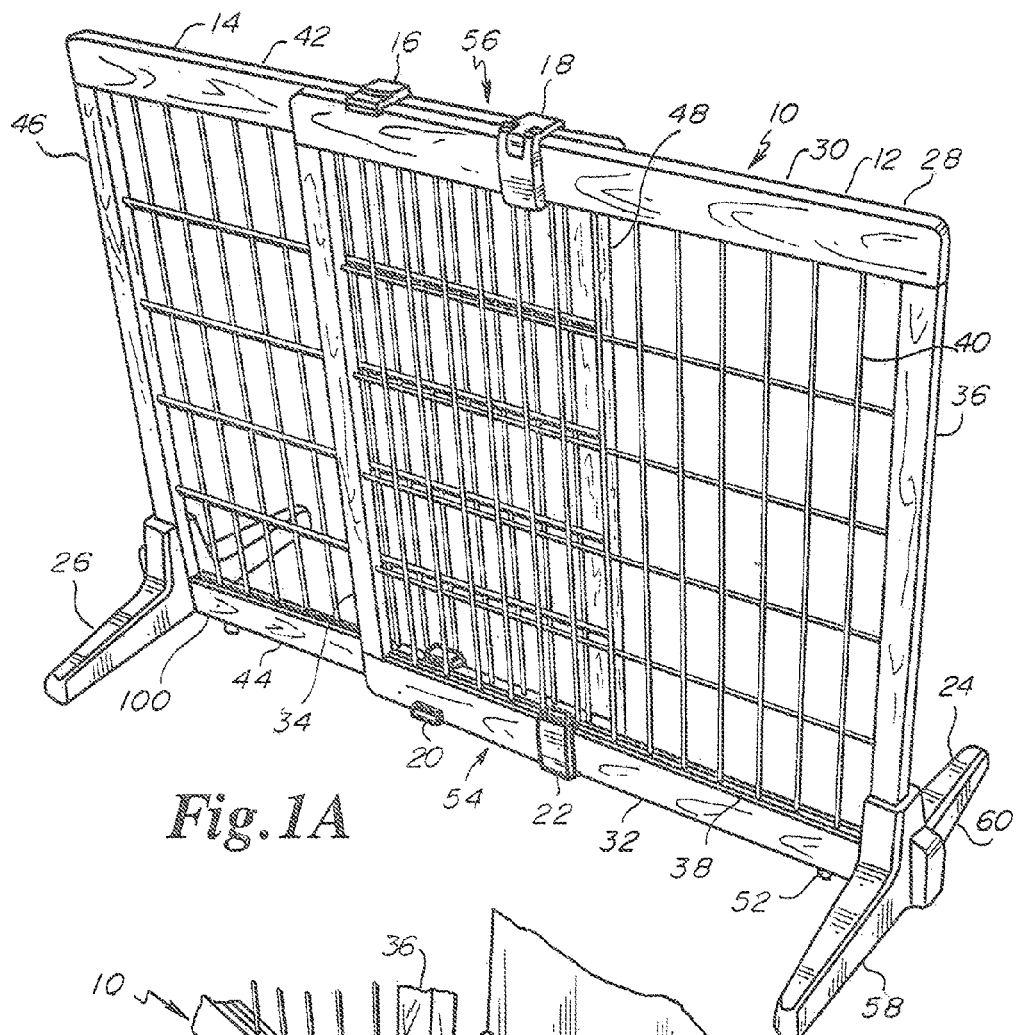
FIG. 1A is perspective view of the present free standing sliding panel footed barrier.

The present free standing sliding barrier is shown in FIGS. 1A and 1s indicated by reference number 10. The barrier 10 generally includes a first main panel 12, a second main panel 14, a set of four slide connectors 16, 18, 20, 22, a first foot 24 and a second foot 26.

The panel 12 includes a frame 28. Frame 28 includes a horizontally extending uppermost frame member 30, a horizontally extending lowermost frame member 32, a vertically extending innermost frame member 34, and a vertically extending outermost frame member 36. Members 30, 32 run parallel to each other. Members 34, 36 run parallel to each other. Members 30, 32 run at right angles to members 34, 36. Members 34, 36 are sandwiched between members 30, 32. Members 30, 32, 34, 36 define a perimeter or periphery of the panel 12.

An endless channel 38 runs about an inner edge of the frame 28 such that a lower edge of member 30 includes a channel portion, such that an upper edge of member 32 includes a channel portion, such that an inner side edge of member 34 includes a channel portion, and such that an inner side edge of member 36 includes a channel portion.

Engaged in the endless channel 38 is a wire grid 40. Wire grid 40 includes an endless wire or rod, of a rectangular or square form, set in the endless channel 38. Wire grid 40 further includes a plurality of horizontally extending wires or rods and a plurality of vertically extending wires or rods.

Panel 14 is identical to panel 12. Each of the panels 12, 14 is set in generally a plane. The planes of the respective panels 12, 14 are parallel to each other and the panels 12, 14 slide parallel to each other by virtue of the slide connectors 16, 18, 20, 22.

Panel 14 includes an uppermost horizontally extending frame member 42, a lowermost horizontally extending frame member 44, an outermost vertically extending frame member 46, and an innermost vertically extending frame member 48.

Slide connector 16 is mounted by pin connectors to a distal end portion of member 30 of panel 12 and removably engages the uppermost horizontally extending frame member 42 of panel 14. Slide connector 20 is mounted by pin connectors to a distal end portion of member 32 and removably engages the lowermost horizontally extending frame member 44 of panel 14. Slide connector 18 is mounted by pin connectors to a distal end portion of member 42 of panel 14 and removably engages the uppermost horizontally extending frame member 30 of panel 12. Slide connector 20 is mounted by pin connectors to a distal end portion of member 44 of panel 14 and removably engages the lowermost horizontally extending frame member 32 of panel 12.

First and second panels 12, 14 are thus engaged to each other and slide past each other in a parallel fashion. Each of the first and second panels 12, 14 includes an outside end, such as vertically extending frame member 36 and vertically extending frame member 46 of panel 14. As to an outside end, the distal outer ends of frame members 30, 32, 42, and 44 can be included in a definition of outside ends of panels 12, 14. The outside ends of panels 12, 14 may slide toward each other to decrease a distance spanned by the barrier 10. The outside ends of panels 12, 14 may slide away from each other to increase a distance spanned by the barrier 10.

Each of the slide connectors 16, 18, 20, 22 generally includes two parts pivotally connected to each other. One part is fixed, such as with pin connectors, to one of the panels 12, 14. The other part pivots into and out of engagement with the other of the panels 12, 14. When the pivoting part is engaged, the panels 12, 14 are fixed relative to each other. When the pivoting part is disengaged, the panels 12, 14 are slideable relative to each other. All slide connectors 16, 18, 20, 22 must be disengaged for the panels 12, 14 to slide relative to each other. For the panels 12, 14 to be fixed against sliding relative to each other, only one of the slide connectors 16, 18, 20, 22 needs to be engaged.

Each of panels 12, 14 includes two legs 50, 52 that depend from the respective lowermost horizontally extending frame member 32, 44. Leg 50 is an inner leg that is found on the inner end portion of the respective lowermost horizontally extending frame member 32, 44. Leg 50 is generally vertically aligned with the respective inner vertically extending frame member 34, 48 of panels 12, 14. Leg 52 is an outer leg that is found adjacent to the outer end portion of the respective lowermost horizontally extending frame member 32, 44. Leg 52 is offset vertically from the respective outermost vertically extending frame member 36, 46. Legs 50, 52 space the panels 12, 14 from an environmental surface such as a floor. Legs 50, 52 provide such a space to permit the lower slide connectors 20, 22 to extend through such space. Legs 50, 52 minimize the amount of sliding contact or surface contact or surface area that the barrier 10 as a whole has with an environmental surface such as a floor. Each of legs 50, 52 is a cylindrical or frustoconical piece that is fixed to the bottom edge of the respective lowermost horizontally extending frame member 32, 44 with a pin connector. Each of legs 50, 52 is formed of a nonslip material such as a rubber or rubber-like or elastomeric or plastic material. The distal end of each of the legs 50, 52 makes direct contact with the floor and this distal end is annular in shape so as to further minimize the amount of surface area of the barrier 10 that makes contact with the floor.

Barrier 10 includes a front side 54 and a rear side 56. First foot 24 extends to the front and rear sides 54, 56. Second foot 26 extends to the front and rear sides 54, 56.

As indicated above, barrier 10 includes first foot 24 and second foot 26. First foot 24 is mounted on panel 12 and second foot 26 is mounted on panel 14. First foot 24 is identical to second foot 26.

First foot 24 includes a front or first portion 58, a back or second portion 60, and a middle portion 62. Front portion 58 includes a first side 64, second side 66, top or top side 68, and underside 70. Back portion 60 includes a first side 72, second side 74, top or top side 76, and underside 78. Front portion 58 includes a proximal end 80 proximate to the middle portion 62 and a distal end 82 distal to the middle portion 62. Back portion 60 includes a proximal end 84 proximate to the middle portion 62 and a distal end 86 distal to the middle portion 62. Sides 64 and 66 of the front portion 58 taper towards each other in the direction of the distal end 82. Sides 72, 74 of the back portion 60 taper towards each other in the direction of the distal end 86. Top 68 of the front portion 58 tapers toward the underside 70 in the direction of the distal end 82. Top 76 of the back portion 60 tapers toward the underside 78 in the direction of the distal end 86. With such a triple taper, the feet 24, 26 provide a relatively great surface area for stabilizing their respective panels 12, 14 and then taper quickly to minimize the amount of space occupied so as to be less obtrusive and maximize safety for children and adults walking near the barrier 10.

Figure 1B:
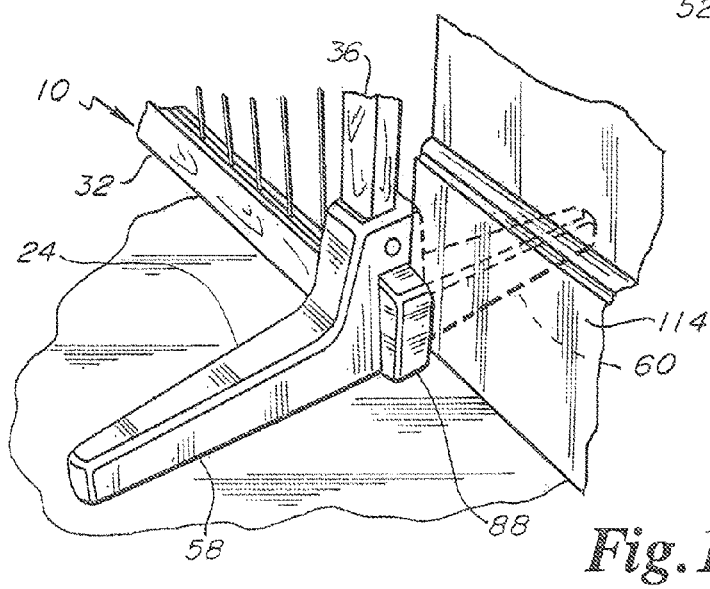
FIG. 1B is a detail perspective view of a foot of the free standing sliding panel footed barrier of FIG. 1A.
Figure 2:
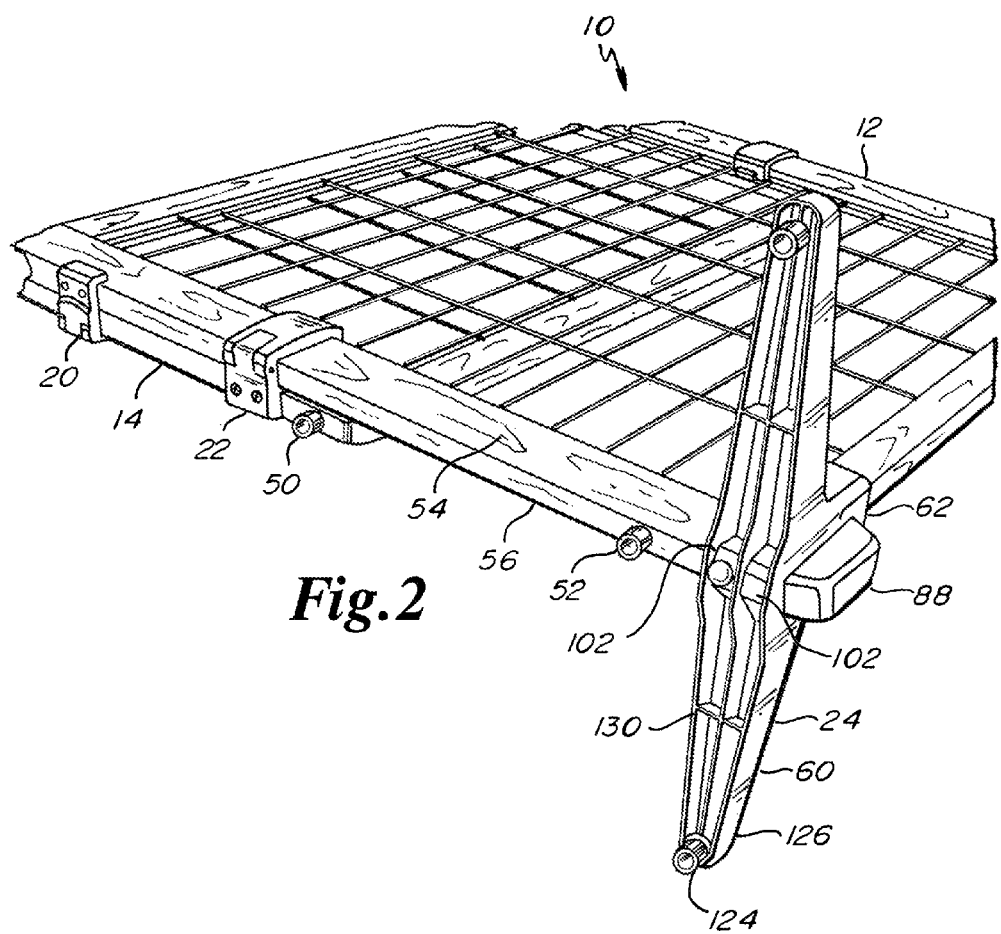
FIG. 2 is a detail perspective bottom view of the foot of the free standing sliding panel footed barrier of FIG. 1A.

Foot 24 further includes an outward extension 88. Outward extension 88 protrudes from the middle portion 62 and extends beyond outer sides 64, 72 of the front and back portions 58, 60 of the feet 24, 26. When on panel 12, extension 88 lies in a common plane with panel 12. Outward extension 88 works as a stop to prevent the barrier 10 from being pushed into a passageway that barrier 10 is intended to close off, as shown in FIG. 1B.

Middle portion 62, exclusive of the outward extension 88, is one-piece and integral with the front portion 58 and back portion 60. Outward extension 88 is not integral with middle portion 62 since extension 88 and middle portion 62 are not molded together. Extension 88 is snap fitted into middle portion 62 and is thus one-piece with middle portion 62 and with front and back portions 58, 60. If desired, extension 88 can be molded with middle portion 62 and front and back portions 58, 60 so as to be one-piece and integral therewith, and the appearance of the foot 24 remains the same, such as shown in FIG. 1B. Outward extension 88 includes plugs 90, 92 that fit into respective openings 94, 96 in middle portion 62 with a friction snap fit.

Opposite of outward extension 88, middle portion 62 includes a slot 98, shown in FIG. 4A, for receiving a lower outside corner portion 100. Slot 98 is formed in part by a floor or floor rib 102 for abutting and supporting the lower edge of lowermost horizontally extending frame member 32. Slot 98 is further formed by a pair of side faces or sides or side ribs 104, 106 for abutting and confronting the front and back faces of the outer end of lowermost horizontally extending frame member 32 and the front and back faces of outermost vertically extending frame member 36. Slot 98 is further formed in part by an end face or end rib 108 for abutting and confronting the end face or outer vertical edge of the outer end of lowermost horizontally extending frame member 32 and the end face or outer vertical edge of outermost vertically extending frame member 36.

Middle portion 62 includes a horizontally extending counterbore or hole 110 extending through face 108. A pin connector such as screw inserted in the counterbored hole 110 will engage the vertically extending outermost frame member 36 so as to tie the foot 24 to the barrier 10.

Middle portion 62 includes a vertically extending hole 112 extending through floor or lower surface 102. A pin connector such as a screw inserted in hole 112 will engage the horizontally extending lowermost frame member 32 so as to further tie the foot 24 to the barrier 10. A boss surrounds hole 112. Holes 110, 112, and thus pin connectors in such holes 110, 112, extend at right angles to each other.

The front portion 58 of the first foot 24 includes a length defining an axis. The back portion 60 of the first foot 24 includes a length defining an axis. The axes of the front and back portions 60 are aligned with each other.

Extension 88 includes a well defined thickness, where the thickness is about the thickness of the lowermost horizontally extending frame member 32. Extension 88 is elongate in the vertical direction and includes opposing vertically running faces, either of which faces can confront and abut a wall or a baseboard 114, as shown in FIG. 1B. Such vertically running faces define the thickness of the outward extension 88.

Extension 88 is preferred to be a pop out or pop in or snap out or snap in type of extension 88, relative to the first foot 24, rather than an extension that is molded integrally and one-piece with the body of the first foot 24 such that, with an overzealous pushing in of the barrier 10 into a passageway, or against a baseboard 114 or other vertical environmental surface, extension 88 will merely pop out of foot 24 rather than the overzealous pushing destroying the integrity of the pin connections between the first foot 24 and the barrier 10. Further, if the end consumer desires the barrier 10 to be set deeper within a doorway, such that barrier 10 may be generally coplanar with a doorway, the extensions 88 can be popped off and not used.

Middle portion 62 includes a top or top edge 116 and an underside 118. Underside 118 is disposed at an altitude below the undersides 70, 78 of the front and back portions 58, 60. Top 116 is disposed at an altitude greater than the uppermost portions of front and back portions 58, 60. Middle section or portion 62 includes a front side 120 proximate the front portion 58 and a back side 122 proximate the back portion 60. The front and back sides 120, 122 taper toward each other and run upwardly to the top 116.

First foot 24 includes a pair of legs 124. One leg 124 depends from the distal end 82 of front portion 58 and the other leg 124 depends from the distal end 86 of back portion 60. Legs 124 space the feet 24, 26 from an environmental surface such as a floor. Legs 124 minimize the amount of sliding contact or surface contact or surface area that the barrier 10 as a whole has with an environmental surface such as a floor. Leg 124 is a cylindrical or frustoconical piece that is fixed to the undersides of feet 24, 26 with a pin connector. Leg 124 is formed of a nonslip material such as a rubber or rubber like or elastomeric or plastic material. The distal or lowermost edge or face of leg 124 makes direct contact with the floor and this distal end is annular in shape so as to further minimize the amount of surface area of the barrier 10 that makes contact with the floor. The placement of first foot 24 on the lower corner portion 100 of panel 12 and the placement of second foot 26 on the lower corner portion 100 of panel 14 remove the need for a leg, such as leg 50 or leg 52, on the lower outside ends of panels 12, 14. Rather, leg 52 is offset from the outermost vertically extending frame member 36, 46 such that leg 52, leg 124 of front portion 58, and leg 124 of back portion 126 form a triangle rather than a straight line.

As shown in FIG. 3B, foot 24 generally includes three upright elongate walls 126, 128, 130 running the length of the foot 24 from distal end 82 to distal end 86. Walls 126, 128, 130 are joined at their upper edges by the tops 68, 76 of the front and back portions 58, 60. Walls 126, 128 and 130 are joined at the distal ends 82, 86. Sides 64, 72 are parts of wall 126. Sides 66, 74 are parts of wall 130. Wall 128 and wall 130 are cut away to form slot 98. Wall 126 includes cutouts 94, 96. Wall 128 may be referred to as a rib. Walls 126, 128, and 130 may be referred to as longitudinally extending walls.

Foot 24 further includes laterally extending inner walls or ribs 132, 134, 136 and 138. Lateral rib 132 is disposed at distal end 82 and forms junctions with walls 126, 128 and 130 and extends from the underside 70 to top 68. The junction between rib 132 and wall 128 forms a hole for a pin connector for mounting leg 124. Lateral rib 134 is disposed intermediate proximal end 80 and distal end 82 and forms junctions with walls 126, 128 and 130 and extends from the underside 70 to top 68. Lateral rib 136 is disposed intermediate proximal end 84 and distal end 86 and forms junctions with walls 126, 128 and 130 and extends from the underside 78 to the top 76. Lateral rib 138 is disposed at distal end 86 and forms junctions with walls 126, 128 and 130 and extends from the underside 78 to the top 76. The junction between rib 138 and wall 128 forms a hole for a pin connector for mounting leg 124.

Floor 102 and sides or side faces 104 and 106 also act in the nature of laterally extending ribs. Side or side face 108, it should be noted, closes off openings 94, 96.

It should be noted that a number of transitions or chamfers or radius structures are found on the feet 24, 26. For example, rounded transition 140 is found at the junction between side 64 and top 68, at the junction between side 66 and top 68, at the junction between side 72 and top 76, at the junction between side 74 and top 76, at the junction between wall 126 and front side 120, at the junction between wall 130 and front side 120, at the junction between wall 126 and back side 122, at the junction between wall 130 and back side 122, at the junction between wall 126 and top 116, and at the junction between wall 130 and top 116.

Transitions or chamfers or radius structures 140 are also found on the extension 88. Extension 88 includes laterally and vertically extending faces 142, 144. Extension 88 further includes an end C-shaped surface 146 that runs from a location adjacent counterbore 110 to a location adjacent the underside of middle section 62. Transitions 140 are found at the junction between face 142 and C-shaped surface 146 and at the junction between face 144 and C-shaped surface 146.

It should be noted that feet 24, 26 are identical to each other. However, since the panels 12, 14 slide in different planes, the distal ends of the feet 24, 26 that are on one side of the barrier 10 fall on a straight line that is oblique to either of these planes in which the panels 12, 14 slide. In other words, these distal ends that are disposed on one side of barrier 10 are offset from each other relative to either of the planes in which the panels 12, 14 slide. Also, it should be noted that when on the panels 12, 14, the slots 98 face each other; thus, on foot 26, as shown in FIG. 1A, the front portion 58 of foot 26 protrudes to the front side 54 of the barrier 10.

In operation, to install the feet 24, 26 on the barrier 10, each of the outside lower corner portions 100 of panels 12, 14 are slid fully into respective slots 98 of feet 24, 26 such that the slot 98 supports a) the lower edge of the lowermost horizontal frame member 32, b) one side face of the lowermost horizontal frame member 32, c) the other side face of the lowermost horizontal frame member 32, d) the outer end of the lowermost horizontal frame member 32, e) the outer vertical edge of outermost vertical frame member 36, f) one side face of the outermost vertical frame member 36, and g) the other side face of the outermost vertical frame member 36. Then connector pins are slid into openings 110, 112 and screwed into, respectively, outermost vertical frame member 36 and lowermost horizontal frame member 32. Then outer extensions 88 are snapped into openings 94, 96.

In operation, to block off a passageway, barrier 10 may, for example, be carried to the inside of a room in which a pet is to be confined. Then the slide connectors 16, 18, 20 and 22 are opened to permit the panels 12, 14 to slide to and away from each other to the proper distance to span the passageway. Then the slide connectors 16, 18, 20 and 22 are closed to lock the panels 12, 14 at a particular width or span distance. Since a pet, especially a dog, has a tendency to push, the barrier 10 is set inside of the room and inside of the passageway intended to be blocked. The barrier 10 can be easily slid into a passageway because the outer sides 64 and 72 of feet 24, 26 are tapered to minimize the struggle of otherwise pushing a square or rectangular piece into a respective square or rectangular piece having widths that are approximately equal. In other words, regardless of whether the front side 54 or the rear side 56 is being pushed into the doorway, the feet 24, 26 together will form a V-shape to make insertion into a doorway easy. The V-shape is formed by outer tapering side 64 of foot 24 in combination with outer tapering side 72 of foot 26 (since in use the slots 98 of feet 24, 26 face each other). Then, after such V-shaped structures have been slid into the doorway, and if the panels 12, 14 have been slid toward or away from each other the proper distance, the outer extensions 88 will abut a wall or baseboard 114, as shown in FIG. 1B, and will keep the barrier 10 in the room and in the passageway and in a position blocking the passageway when the dog tries to push on the barrier 10.

In operation, to take the barrier 10 out of the passageway, the user can simply grasp, for example, a portion of the uppermost frame member 30 and slide the barrier 10 as a whole away from the passageway and into the room confining the pet. Or the user can slide one end of the barrier 10 at least partially out of the passageway, an action that is made relatively easy by the tapering of the outer sides 64, 72 of feet 24, 26.

U.S. patent application Ser. No. 13/149,721 filed May 31, 2011 and entitled Barrier With Panels Sliding Parallel is hereby incorporated by reference in its entirety into this application.

Figures 5A, 5B:
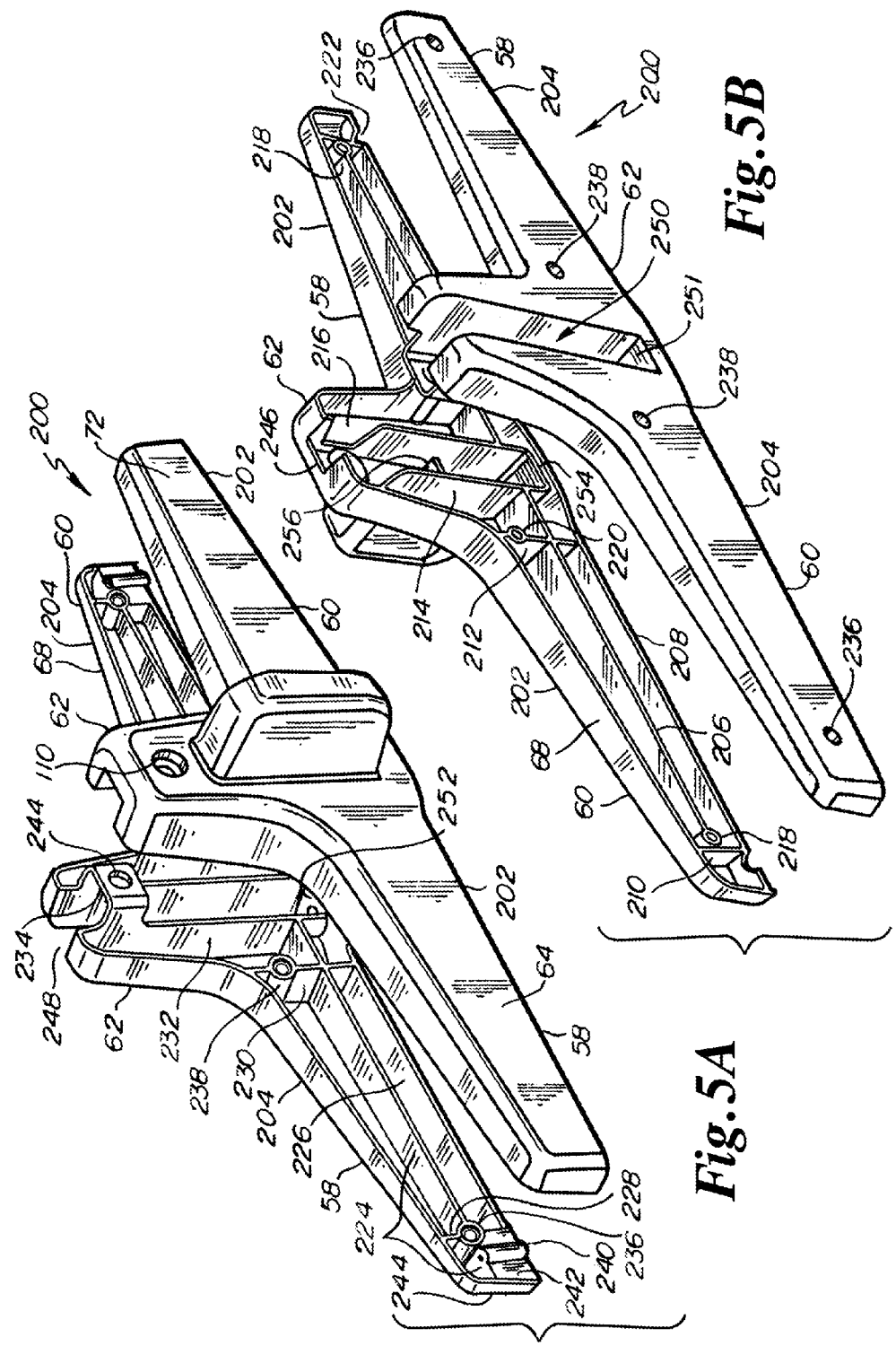
FIG. 5A is perspective end view of an alternate embodiment of the foot of FIG. 1A, where the foot of FIG. 5A is in a preassembled state.
FIG. 5B is a perspective end view of the foot of FIG. 5A showing the foot in a preassembled state and from the end other than the end of FIG. 5A.

Barrier 10 may include foot 200 instead of first and second feet 24, 26. Foot 200 may be mounted on each of panels 12, 14. Foot 200 is shown in FIGS. 5A and 5B. Foot 200 is longitudinally split for shipping and storage. Foot 200 is assembled prior to placement on either of the panels 12, 14.

When assembled, foot 200 includes an external or exterior shape and structure that is identical to feet 24, 26, except that foot 200 includes a central longitudinally extending seam.

Foot 200 includes a longitudinally extending outer half section 202 and a longitudinally extending inner half section 204.

As an example of the external or exterior shape and structure that is identical to feet 24, 26, foot 200 includes front or first portion 58, back or second portion 60, and a middle portion 62 and the respective external details of portions 58, 60 and 62. For reference to the respective details of portions 58, 60 and 62 and their external details, please see the description as to feet 24, 26. Differences between feet 24 and 26 on the one hand and foot 200 on the other hand are now set forth.

Portions 58 and 60 of half section 202 are the same. Since the interior of portion 60 of half section 202 is shown in FIG. 5B, only portion 60 of half section 202 is discussed. The interior of portion 60 includes a set of horizontally and vertically extending ribs 206, 208, 210, 212, 214. Rib 208 can also be referred to as an underside 208 or a floor 208. Rib 210 is an end rib that extends vertically and laterally. End rib 210 extends vertically between rib or floor 208 and top 68 of half section 202. Intermediate rib 212 extends vertically and laterally between the rib or floor 208 and top 68 at the middle portion 62 of half section 202. Intermediate rib 212 forms a junction with horizontal rib 206. Slot rib 214 extends vertically and laterally from rib or floor 208 in the middle portion 62 of half section 202 and includes an indent or receptor 216 formed in an upper portion thereof. Rib 206 extends horizontally and laterally from slot rib 214 to rib 212, where ribs 206, 212 form a junction. Rib 206 continues from such junction to a boss 218. Boss 218 in turn is fixed to end rib 210. Ribs 206, 208, 210, 212, and 214 extend laterally from a sidewall of portion 60 of outer half section 202. Rib 212 includes a boss 220 formed in an upper portion thereof. Portion 60 of half section 202 further includes an indent or receptor 222 formed in rib or floor 208 at an end of portion 60. Indent 222 is adjacent to a junction between vertical end rib 210 and rib or floor 208.

Portions 58 and 60 of inner half section 204 are the same. Since the interior of portion 58 of half section 204 is shown in FIG. 5A, only portion 58 of half section 204 is discussed. The interior of portion 58 of inner half section 204 includes a set of horizontally and vertically extending ribs 224, 226, 228, 230, and 232. Ribs 224, 226, 228, 230, and 232 extend laterally from a sidewall of portion 58 of inner half section 204. Rib 224 can also be referred to as an underside 224 or a floor 224. Rib 228 is an end rib that extends vertically and laterally. End rib 228 extends vertically between rib or floor 226 and top 68 of half section 204. Intermediate rib 230 extends vertically and laterally between the rib or floor 226 and top 68 at the middle portion 62 of half section 204. Intermediate rib 230 forms a junction with horizontal rib 224. Slot rib 232 extends vertically and laterally from rib or floor 226 in the middle portion 62 of half section 204 and includes a U-shaped piece 234 extending from an upper portion thereof. Intermediate horizontal rib 224 extends horizontally and laterally from slot rib 232 to rib 230, where ribs 224, 230 form a junction. Rib 224 continues from such junction to a boss 236. Boss 236 in turn is formed in end rib 228. Intermediate horizontal rib 224 continues from boss 236 to an end wall 244 of the portion 58 of half section 204. Intermediate vertical rib 230 includes a boss 238 formed in an upper portion thereof. Portion 58 of half section 204 further includes vertical boss 240 extending from rib or floor 226 to intermediate horizontal rib 224. Vertical boss 240 is formed in a vertical and longitudinally extending rib 242 that extends from the end wall 244 of portion 58 of half section 204 to end rib 228.

A boss herein is a cylindrical structure with a pin opening extending axially therethrough. A pin may slide through the pin opening. The threaded end of a screw may bite into a boss to draw the half sections 202, 204 together. A boss may be threaded and engage a threaded end of a pin connector. A boss may receive a rivet. Bosses have two open ends on inner half section 204. Bosses on half section 202 have a closed end.

To assemble the half sections 202 and 204, a pin connector is inserted into each of the bosses 236 of half section 204. These pin connectors then bite into coaxial bosses 218 of half section 202. Also, a pin connector is inserted into each of bosses 238 of half section 204. These pin connectors then bite into coaxial bosses 220 of half section 202. As the pin connectors draw the half sections 202, 204 together, ribs 206, 208, 210, 212, 214 of half section 202 line up in common planes respectively with ribs 224, 226, 228, 230, 232 of half section 204. As the pin connectors draw the half sections 202, 204 together, vertical bosses 240 are received in respective indents 222. As the pin connectors draw the half sections 202, 204 together, U-shaped piece 234 is received in receptor 216. U-shaped piece 234 includes an opening 244 that lines up to be coaxial with opening 110. Openings 110, 244 receive a pin connector that bites into one of panels 12, 14.

As can be appreciated, foot 200 includes an underside different from feet 24, 26. The underside of foot 200 is closed. The underside of feet 24, 26 is open.

Vertical boss 240 receives a pin connector for mounting feet 124.

Outer extension 88 is found on half section 202. Outer extension 88 may be solid plastic or may be hollow or may include horizontal ribs or a set of vertical and horizontal ribs. Outer extension 88 of foot 200 works as a stop to prevent the barrier 10 from being pushed into a passageway that barrier 10 is intended to close off, as foot 24 shown in FIG. 1B. Extension 88 can be molded with middle portion 62 and front and back portions 58, 60 of half section 202 so as to be one-piece and integral therewith.

Half section 202 includes a slot portion 246 and half section 204 includes a slot portion 248. In combination, slot portions 246, 248 form a slot 250 for receiving one of the panels 12, 14. Slot portion 248 is formed by opposing slot ribs 232 and a slot floor 251 extending between slot ribs 232. A boss 252 is formed in the slot floor 251 for receiving a vertically extending pin connector that bites into one of the main panels 12, 14 that is received in slot 250. Slot portion 248 is further formed by U-shaped piece 234. Slot portion 246 is formed by opposing slot ribs 214 and a slot floor 254 extending between slot ribs 214. Slot floors 215, 254 are coplanar with each other when the foot 200 is assembled. As stops for one of the panels 12, 14 that is inserted into slot 250, half section 204 includes the U-shaped piece 234 that confronts hole 110 when the foot is assembled and half section 202 includes a horizontal rib 256 extending between slot ribs 214. Rib 256 may continue into outer extension 88 to serve as an inner support for outer extension 88. The inner edge of rib 256 and the outer longitudinally extending section of U-shaped piece 234 may be aligned in a common plane. The outer longitudinally extending edge portion of slot 246 may also be in this common plane and serve as a stop for one of the main panels 12, 14.

The front portion 58 of the foot 200 includes a length defining an axis. The back portion 60 of foot 200 includes a length defining an axis. The axes of the front and back portions 58, 60 are coaxial to form a common axis. This common axis lies in a vertical plane. The outer face of the inner half section 204 is generally defined by this vertical plane. The inner face of outer half section 202 is generally defined by this vertical plane. Each of the half sections 202, 204 is one-piece and integral to offer longitudinal support along the longitudinal length of each of the half sections 202, 204 and thus to offer longitudinal support to foot 200 when assembled.

When the half sections 202, 204 are drawn fully together by the pin connectors, the external surface of half sections 202, 204 become identical to feet 24, 26 except for the longitudinally running seam defining the vertical plane of the common axis referred to above.

Foot 200 may be installed on barrier 10 the same way feet 24, 26 are installed on barrier 10 as described above.

Barrier 10 with two feet 200 may be operated as described above with respect to feet 24, 26. For example, two feet 200 are employed on one barrier 10. Each of the feet 200 includes a longitudinally extending axis. Each of the feet 200 further includes a vertical outer wall or vertical first side 64 that tapers inwardly as the longitudinal axis of foot 200 extends away from the middle portion 62. Each of the feet 200 further includes a vertical outer wall or vertical first side 72 that tapers inwardly as the longitudinal axis of foot 200 extends away from middle portion 62. Thus, opposing vertical first sides 64, 72 of opposing feet 200 (on opposite ends of barrier 10) form a V-shape or a portion of a V-shape. Hence, when barrier 10 is being pushed into the doorway, this V-shape or V-shape portion makes for easy insertion of feet 200 and barrier 10 into a doorway. Then, after such V-shaped structure of feet 200 have been slid into the doorway, and if the panels 12, 14 have been slid toward or away from each other the proper distance, the outer extensions 88 of feet 200 will abut a wall or baseboard 114 or door jamb and will keep the barrier 10 in the room and in the passageway and in a position blocking the passageway when the dog tries to push on the barrier 10.

In operation, to store barrier 10 and feet 200, each of the feet 200 may be disassembled by removing the pin connectors from their respective bosses. The thickness of the feet 200 are thereby reduced. The thickness (lateral distance from outer longitudinal surface of one half section to the inner longitudinal surface of the same half section) of half section 202 (having extension 88) is about the thickness two panels 12, 14 placed back to back (face to face) such that the disassembled half sections 202, 204 can be readily stored in the shipping and storage box in which the panels 12, 14 are stored without damaging the shipping box or the half sections 202, 204. In other words, the thickness of outer half section 202 is about twice the thickness of panel 12 (or about twice the thickness of panel 14). In shipping, shipping box thickness is greatly reduced by minimizing the thickness of foot 200 and such is minimized by splitting foot 200 into two half sections 202, 204. The thickness of outer half section 202 is greater than that of inner half section 204 because outer half section 202 includes extension 88 that extends in the thickness direction.

Barrier 10 may include foot 300 instead of first and second feet 24, 26 or feet 200 except that foot 300 does not have the longitudinally extending seam that foot 200 does. Foot 300 may be mounted on each of panels 12, 14. Foot 300 is shown in FIGS. 6A, 6B and 6C. Foot 300 includes a retractable extension 88.

Foot 300 includes an external or exterior shape and structure that is identical to feet 24, 26, 200. For example, foot 300 includes front or first portion 58, back or second portion 60, and a middle portion 62 and the respective external details of portions 58, 60 and 62.

Foot 300 can include the internal or interior shape and structure of either feet 24, 26 or feet 200. For reference to such, please see the description herein as to feet 24, 26, and 200.

Feet 24, 26 can include a removable extension 88 as shown in FIG. 3B. Foot 200 includes an extension 88 that is one-piece and integral with outer half section 202. Foot 300 includes a retractable extension 88.

Retractable extension 88 may be a hollow piece or a solid piece or a semi-hollow piece with ribs. If a semi-hollow piece, retractable extension 88 can have laterally and/or vertically extending ribs running internally for support.

Retractable extension 88 includes an upper internal stop 302 and a lower internal stop 304. Stop 302 projects upwardly and beyond an upper distal surface end of C-shaped surface 146. Stop 304 projects downwardly and beyond a lower distal surface end of C-shaped surface 146.

Middle portion 62 includes an outer vertical longitudinally extending wall 306 and an outer vertical longitudinally extending wall 308. A slot 310 is formed in outer wall 306. Slot 310 is formed in part by an upper edge 312 and a lower edge 314. Lower edge 314 is spaced from a floor 316, which supports a bottom edge of one of the main panels 12, 14. Upper edge 312 is spaced from a lower edge of a boss 316 that includes horizontally extending hole 110. Laterally extending internal ribs or sidewalls 318, 320 form sides of slot 310. Sidewalls 318 extend from floor 316 to the top of middle portion so as to form slot 98. Slot 98 is open at a top end, closed at a bottom end, and open at a rear end. Slot 98 accepts a corner portion of one of the panels 12, 14. Slot 310 in outer wall 308 communicates with slot 98.

Retractable extension 88 is inserted into foot 300 in a direction from the inner wall 308 to the outer wall 306. Retractable extension 88 is first inserted into slot 98 and then into slot 310. Retractable extension 88 is inserted into slot 310 until the front faces of the stops 302, 304 abut the rear surfaces of outer wall 306. Front face of upper stop 302 abuts the rear surface of outer wall 306 between upper edge 312 and a lower edge of boss 316. Front face of lower stop 304 abuts the rear surface of outer wall 306 between lower edge 314 and floor 316. Then one of the main panels 12, 14 is inserted into slot 98. Then the vertical edge of the corner portion of one of the panels 12, 14 pushes against a rear peripheral edge 322 of retractable extension 88 (and rear edges of horizontally laterally extending ribs disposed therein) to push the stops 302, 304 against inner portions of wall 306, whereupon the rear peripheral edge 322 is generally flush with a rear surface of boss 316. A horizontal pin connector such as a screw is then inserted into opening 110 and through boss 316 to bite into the panel received in slot 98. A vertical pin connector extending through opening 112 (shown in FIG. 4E) bites into an underside of the panel that is received in slot 98. Barrier 10, having foot 300 and retractable extension 88, may then be operated as feet 24, 26 and 200.

In shipping and storage, retractable extension 88 may be set inside of slot 98 with retractable extension 88 contained within walls 306, 308 and protruding from neither wall 306 nor wall 308. The length of retractable extension (the lateral distance between ends of the extension 88) is less than or equal to the thickness of foot 300 at middle portion 62 (the lateral distance between walls 306, 308). The thickness of foot 300 with retractable extension 88 between walls 306, 308 is about the thickness of panels 12, 14 placed back to back (or face to face) such that the thickness of foot 300 at middle portion 62 with extension 88 retracted is about twice the thickness of a single panel 12 or a single panel 14.

A part or parts from one embodiment may be added to another embodiment. A part or parts from one embodiment may be replaced with a part or parts of another embodiment. In other words, a foot according to the invention may feature a first part from a first embodiment, a second part from a second embodiment, a third part from a third embodiment, a fourth part from a fourth embodiment, and so on.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A free standing sliding panel footed barrier, comprising:
   a) first and second panels engaged to each other and sliding past each other in parallel fashion, wherein each of the first and second panels includes an outside end, wherein each of the outside ends slide toward each other to decrease a distance spanned by the barrier, wherein each of the outside ends slide away from each other to increase a distance spanned by the barrier, wherein the barrier includes a front side, and wherein the barrier includes a back side;
   b) a first foot engaging the first panel for supporting the first panel relative to a floor, wherein the first foot includes a front portion that extends to the front side of the barrier and a back portion that extends to the back side of the barrier;
   c) a second foot engaging the second panel for supporting the second panel relative to said floor, wherein the second foot includes a front portion that extends to the front side of the barrier and a back portion that extends to the back side of the barrier;
   d) wherein the first panel lies generally in a plane, wherein the first foot includes a middle portion between the front and back portions of the first foot, wherein the middle portion includes an extension that protrudes outwardly of the front and back portions of the first foot and that lies generally in the plane of the first panel whereby said extension works as a stop for preventing the barrier from being pushed through a passageway;
   e) wherein the extension protrudes at a right angle to the front and back portions of the first foot; and
   f) wherein the extension includes a front face, a rear face, and a bottom face, wherein the front face extends laterally and vertically, wherein the rear face extends laterally and vertically, wherein the bottom face is disposed between the front and rear faces, wherein the bottom face is adjacent to and spaced from a surface on which the free standing sliding panel footed barrier is standing, wherein said bottom face is adjacent to said first foot and to said surface at a location generally in the plane of the first panel.

2. The free standing sliding footed panel barrier of claim 1, wherein the first panel includes a lower outside vertically extending portion having a vertical edge, a front face and a back face, and wherein the first foot includes a vertically extending slot for receiving the lower outside vertically extending portion and confronting the vertical edge, front face and back face of the lower outside vertically extending portion.

3. The free standing sliding panel footed barrier of claim 1, wherein the first panel includes a lower outside horizontally extending portion having a horizontal edge, a front face and a back face, and wherein the first foot includes a horizontally extending slot for receiving the lower outside horizontally extending portion and confronting the horizontal edge, front face and back face of the lower outside horizontally extending portion.

4. The free standing sliding panel footed barrier of claim 1, wherein the first panel includes a lower outside corner portion having a vertical edge and a horizontal edge, and wherein the first foot includes a slot for receiving the lower outside corner portion.

5. The free standing sliding panel footed barrier of claim 1, wherein said front portion of said first foot includes a proximal end, an outer side, an inner side, a top side, underside and a distal end, wherein the proximal end is proximate the back portion of the first foot and the distal end is distal from the back portion of the first foot, wherein said outer and inner sides taper toward each other and toward the distal end, and wherein said top side tapers toward the underside and toward the distal end such that space occupied by the first foot is minimized so as to maximize safety for people walking nearby.

6. The free standing sliding panel footed barrier of claim 1, wherein the front portion of the first foot includes a length, wherein the back portion of the first foot includes a length, wherein each of the lengths includes an axis, and wherein the axes of the lengths are aligned with each other.

7. The free standing sliding panel footed barrier of claim 1, wherein the first foot includes a middle portion between the front and back portions of the first foot, and wherein the middle portion includes a slot that receives a section of the first panel.

8. The free standing sliding panel footed barrier of claim 1, wherein the first foot includes a middle portion between the front and back portions of the first foot, and wherein the middle portion includes a section that rises to an altitude higher than uppermost sections of the front and back portions of the first foot.

9. The free standing sliding panel footed barrier of claim 1, wherein the first foot includes a middle portion between the front and back portions of the first foot, wherein the middle section includes a front side proximate the front portion of the first foot and a back side proximate the back portion of the first foot, and wherein the front and back sides of the middle section taper toward each other and run upwardly.

10. The free standing sliding panel footed barrier of claim 1, wherein the first foot is engaged to the first panel by a first pin connector running horizontally and by a second pin connector running vertically.

11. The free standing footed barrier apparatus of claim 1, wherein the front portion of the first foot includes a front floor abutting surface that rests upon the floor, wherein the back portion of the first foot includes a back floor abutting surface that rests upon the floor, the front and back floor abutting surfaces defining a line, and the bottom face of the extension being at a greater elevation than said line such that the bottom face of the extension is spaced from the floor.

12. A free standing sliding panel footed barrier, comprising:
   a) first and second panels engaged to each other and sliding past each other in parallel fashion, wherein each of the first and second panels includes an outside end, wherein each of the outside ends slide toward each other to decrease a distance spanned by the barrier, wherein each of the outside ends slide away from each other to increase a distance spanned by the barrier, wherein the barrier includes a front side, and wherein the barrier includes a back side;
b) a first foot engaging the outside end of the first panel for supporting the first panel relative to a floor, wherein the first foot includes a front portion that extends to the front side of the barrier and a back portion that extends to the back side of the barrier;
c) a second foot engaging the outside end of the second panel for supporting the second panel relative to said floor, wherein the second foot includes a front portion that extends to the front side of the barrier and a back portion that extends to the back side of the barrier;
d) wherein the first foot includes a first extension protruding outwardly of and at a right angle to the front and back portions of the first foot and wherein the second foot includes a second extension protruding outwardly of and at a right angle to the front and back portions of the second foot, whereby said first and second extensions work as stops for preventing the barrier from being pushed through a passageway;
e) wherein the first foot comprises outer and inner first half sections that are engaged to each other, wherein an inner face of the outer first half section and an outer face of the inner first half section are generally defined by a longitudinally and vertically running plane;
f) wherein the outer first half section and the inner first half section of the first foot are about equal in length;
g) wherein the second foot comprises outer and inner second half sections that are engaged to each other, wherein an inner face of the outer second half section and an outer face of the second first half section are generally defined by a longitudinally and vertically running plane; and
h) wherein the outer second half section and the inner second half section of the second foot are about equal in length.

13. The free standing sliding panel footed barrier of claim 12, wherein said first panel lies generally in a first plane, wherein said first extension lies generally in the first plane, wherein said second panel lies generally in a second plane, and wherein said second extension lies generally in said second plane.

14. The free standing sliding panel footed barrier of claim 12, wherein the first foot includes a middle portion between the front and back portions of the first foot, and wherein the middle portion includes a slot that receives a section of the first panel.

15. The free standing sliding panel footed barrier of claim 12, wherein the first foot includes a middle portion between the front and back portions of the first foot, and wherein the middle portion rises to an altitude that is greater than uppermost sections of the front and back portions of the first foot and greater than an uppermost section of the first extension.

16. The free standing sliding panel footed barrier of claim 12, wherein the first foot includes a middle portion between the front and back portions of the first foot, wherein the middle section includes a front side proximate the front portion of the first foot and a back side proximate the back portion of the first foot, and wherein the front and back sides of the middle section taper toward each other and run upwardly.

17. A free standing sliding panel footed barrier, comprising:
a) first and second panels engaged to each other and sliding past each other in parallel fashion, wherein each of the first and second panels includes an outside end, wherein each of the outside ends slide toward each other to decrease a distance spanned by the barrier, wherein each of the outside ends slide away from each other to increase a distance spanned by the barrier, wherein the barrier includes a front side, and wherein the barrier includes a back side;
b) a first foot engaging the first panel for supporting the first panel relative to a floor, wherein the first foot includes a front portion that extends to the front side of the barrier and a back portion that extends to the back side of the barrier;
c) a second foot engaging the second panel for supporting the second panel relative to said floor, wherein the second foot includes a front portion that extends to the front side of the barrier and a back portion that extends to the back side of the barrier;
d) wherein the first panel lies generally in a plane, wherein the first foot includes a middle portion between the front and back portions of the first foot, wherein the middle portion includes an extension that protrudes outwardly of the front and back portions of the first foot and that lies generally in the plane of the first panel whereby said extension works as a stop for preventing the barrier from being pushed through a passageway;
e) wherein the extension protrudes at a right angle to the front and back portions of the first foot;
f) wherein the extension includes a front face, a rear face, and a bottom face, wherein the front face extends laterally and vertically, wherein the rear face extends laterally and vertically, wherein the bottom face is disposed between the front and rear faces, wherein the bottom face is adjacent to a surface on which the free standing sliding panel footed barrier is standing, wherein said bottom face is adjacent to said first foot and to said surface at a location generally in the plane of the first panel;
g) wherein the first panel includes a lower outside corner portion having a vertical edge and a horizontal edge, and wherein the first foot includes a slot for receiving the lower outside corner portion; and
h) the slot being defined by a top open face and an inner side open face such that the top open face and inner side open face communicate with each other, such that the top open face and inner side open face in combination make up an L-shaped open face, and such that the L-shaped open face permits access by said lower outside corner portion.

* * * * *